United States Patent [19]

Lane

[11] Patent Number: 5,793,493

[45] Date of Patent: Aug. 11, 1998

[54] SYSTEM FOR MAINTAINING THE CUTTING CONDITION OF DOUBLE GROUND KNIFE BLADES

[75] Inventor: Jeffrey Scott Lane, Moore, S.C.

[73] Assignee: Milliken Research Corporation, Spartanburg, S.C.

[21] Appl. No.: 832,664

[22] Filed: Apr. 4, 1997

[51] Int. Cl.[6] .................................................. G01B 11/24
[52] U.S. Cl. ........................ 356/376; 356/375; 364/551; 364/474
[58] Field of Search .................................. 356/376, 375, 356/399; 364/551, 474

[56] References Cited

U.S. PATENT DOCUMENTS

| | | |
|---|---|---|
| 2,741,153 | 4/1956 | Reason et al. . |
| 3,025,747 | 3/1962 | Casselman et al. . |
| 3,388,631 | 6/1968 | Glowa . |
| 3,586,865 | 6/1971 | Baker . |
| 4,176,396 | 11/1979 | Howatt . |
| 5,255,199 | 10/1993 | Barkman et al. . |
| 5,278,632 | 1/1994 | Shotwell . |
| 5,361,308 | 11/1994 | Lee et al. . |
| 5,444,536 | 8/1995 | Satzger et al. . |

Primary Examiner—Frank G. Font
Assistant Examiner—Reginald A. Ratliff
Attorney, Agent, or Firm—Terry T. Moyer; George M. Fisher

[57] ABSTRACT

A system for estimating the cutting condition of a double ground knife blade in which the width of each of the two adjacent bevels comprising the cutting edge are compared. The two bevels may be pictured on a monitor and compared visually, or may be processed to generate a data display or, additionally, signals to control a sharpening device.

10 Claims, 5 Drawing Sheets

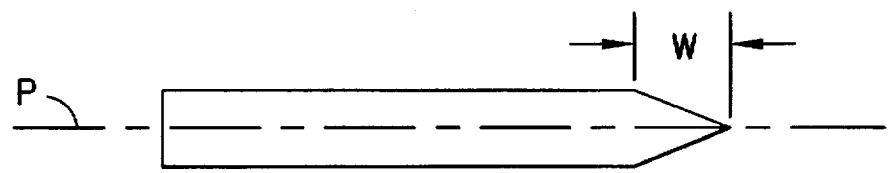
FIG. -1A-
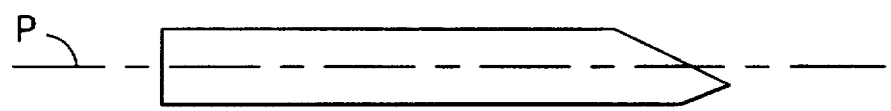
FIG. -1B-
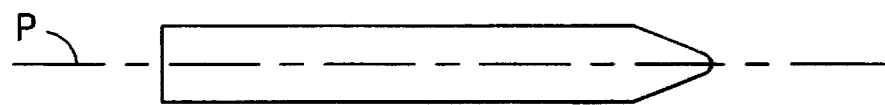
FIG. -1C-
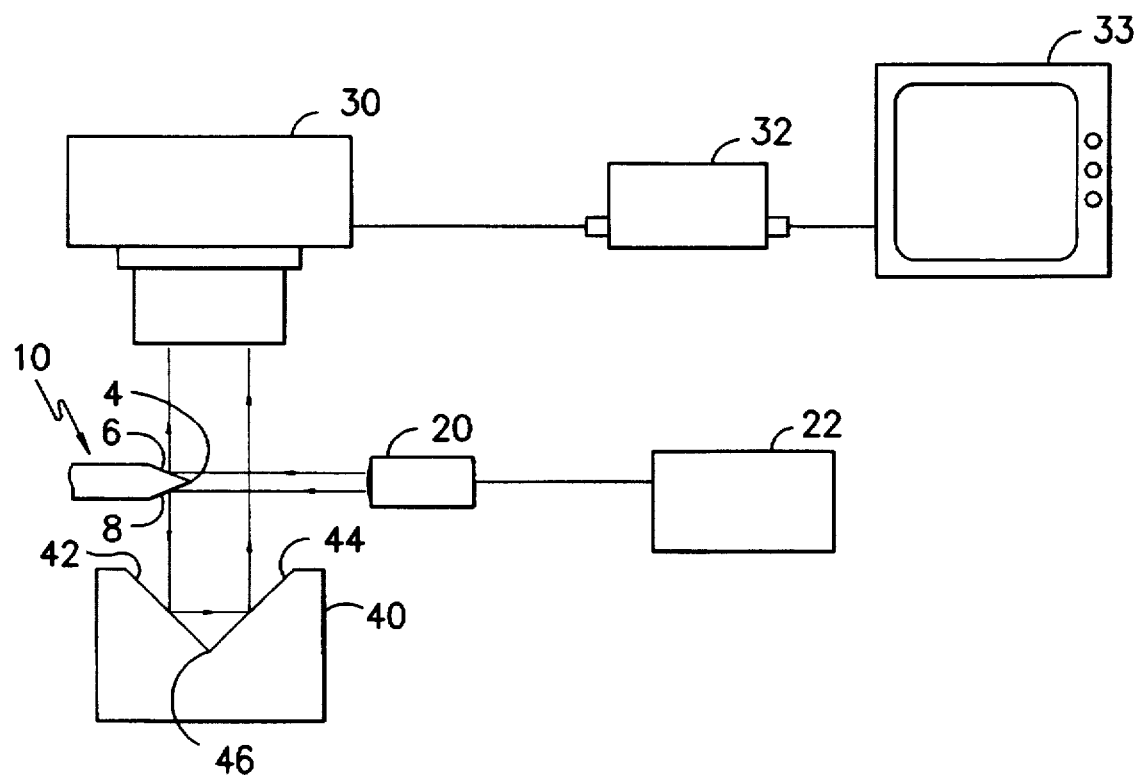
FIG. -2-

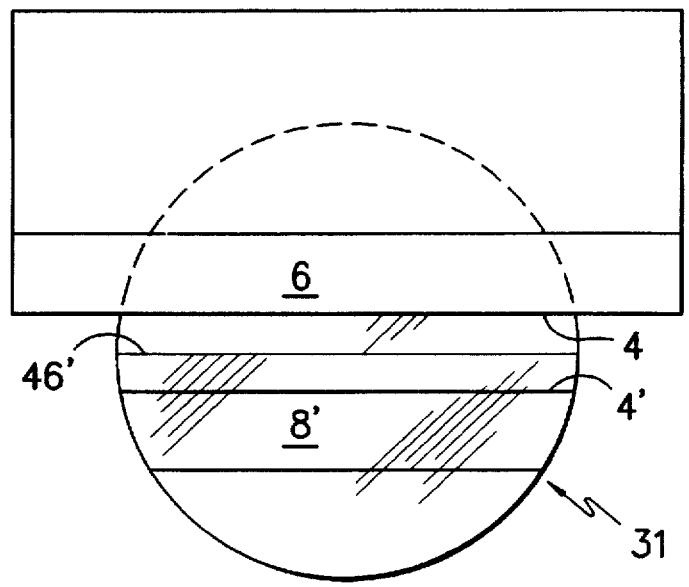
FIG. −3A−
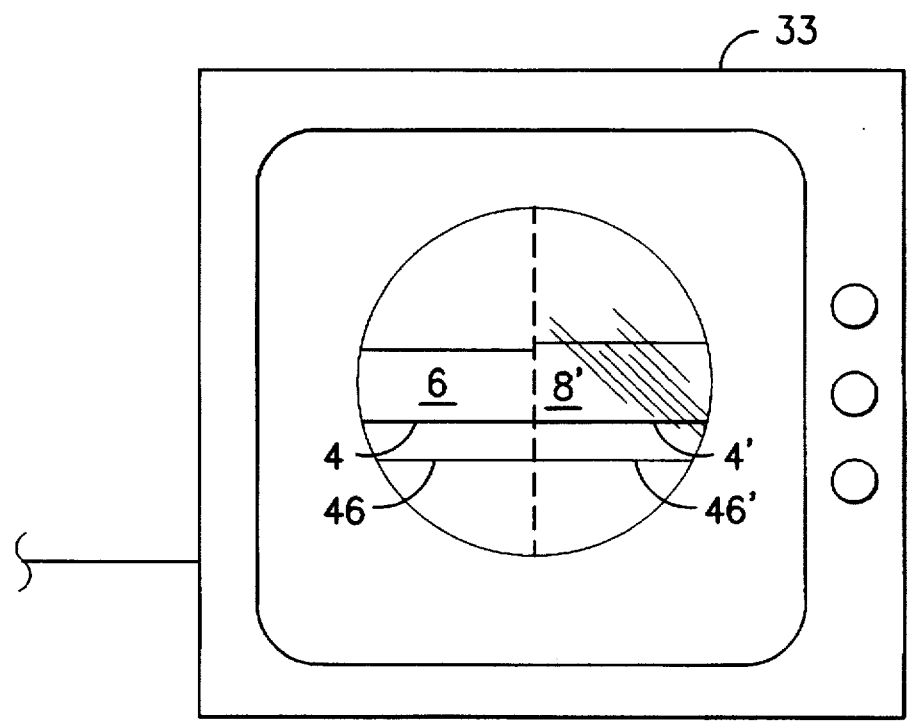
FIG. −3B−

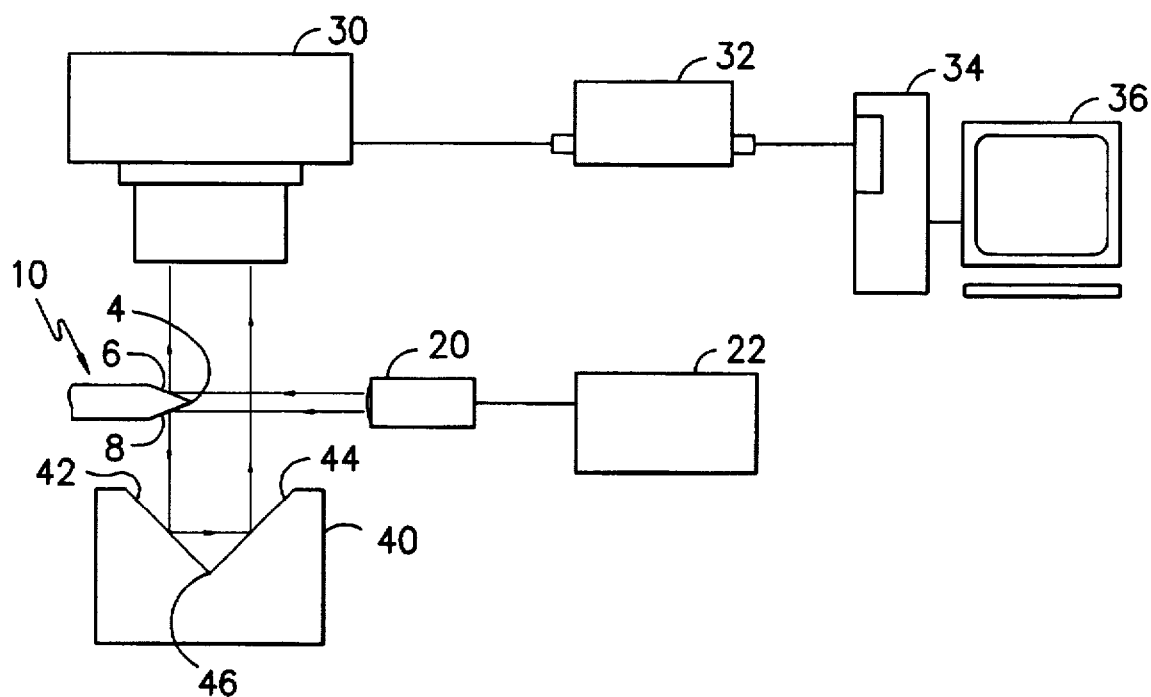
FIG. —4—

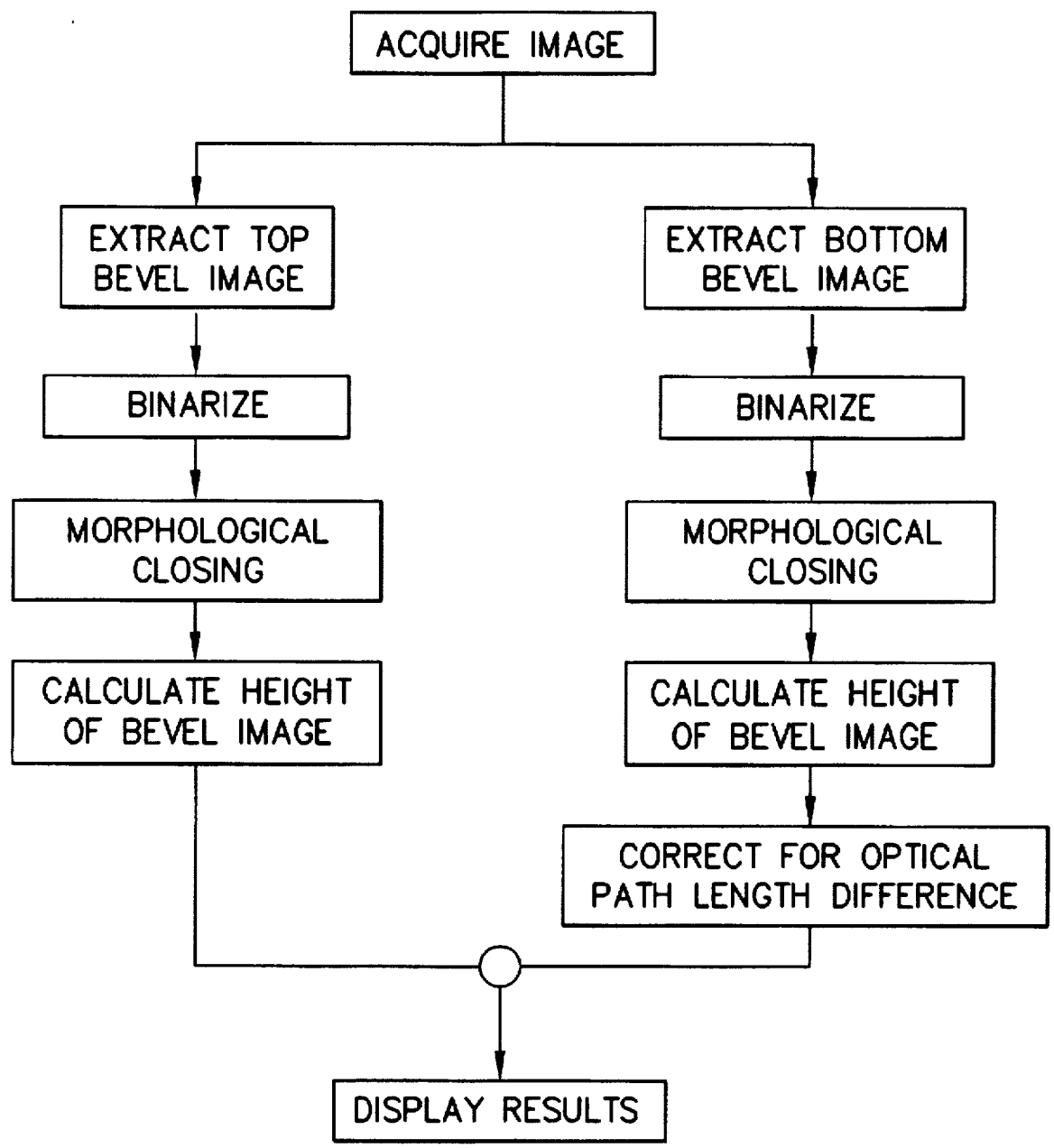
FIG. -5-

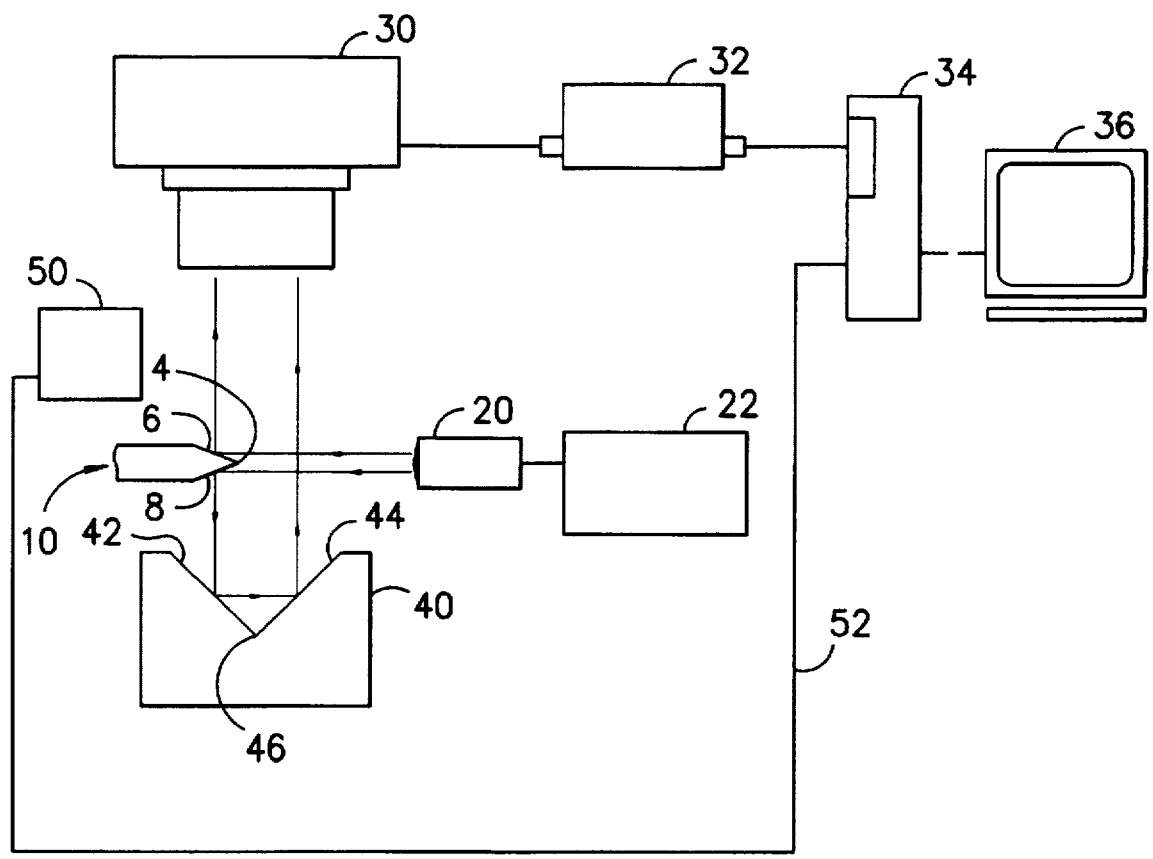
FIG. -6-

SYSTEM FOR MAINTAINING THE CUTTING CONDITION OF DOUBLE GROUND KNIFE BLADES

BACKGROUND OF THE INVENTION

This invention relates generally to a system to estimate visually the cutting condition of a knife blade. More specifically, this invention relates to a system that provides for the manual or automatic comparison of the width of the bevelled portion on both sides of a sharpened knife blade at the same location along the length of the blade (thereby providing an estimate of the extent to which the individual bevels are of equal width) and a system by which the cutting condition of the blade may be maintained. This invention is particularly suited to blades in which the cutting edge is moving in a direction parallel to the cutting edge, as opposed to cutters which move in an oblique direction to the cutting edge, or which tend to cut by means of a pinching motion, with blade movement essentially perpendicular to the cutting edge.

Knife blades having cutting edges formed from grinding or otherwise removing metal or other blade stock material from both sides of the blade (hereinafter, a "double ground" blade or cutting edge) are in common use in a wide variety of industrial cutting operations, including cutting or separating materials in web, sheet, or slab form, such as textile fabrics, carpets, and the like. These blades are to be distinguished from a "single ground" blade or edge in which the cutting edge is formed by grinding or otherwise removing material from only one side of the blade.

A problem that can arise from the use of such double ground blades is an impairment of cutting efficiency or quality due to asymmetries that develop between the bevel associated with one side of the cutting edge and the corresponding bevel on the opposite side of the cutting edge. These asymmetries often are manifested in the "width" of the bevel, i.e., the distance between the leading, or outside, edge of the bevel that forms the cutting edge and the trailing, or inside, edge of the bevel (usually parallel to the cutting edge) that forms the boundary between the sharpened and unsharpened portion of the blade.

When the bevel width on one side of the cutting edge becomes significantly different from the bevel width on the opposite side of the cutting edge, cutting efficiency and quality frequently are degraded. Because these bevels can be quite narrow in width, sometimes being on the order of 0.1 inch or less, they are difficult to inspect visually, particularly without some sort of optical assistance or enhancement. The problem of making this inspection is compounded if the blade is installed in a relatively inaccessible part of an industrial machine, if the cutting edge is moving, or if other circumstances make direct observation of the beveled portion of the blade difficult. Perhaps the most daunting problem is presented by the need to observe both sides of the cutting edge, so that the bevel width on one side of the cutting edge can be compared with the corresponding bevel width on the other side of the cutting edge, ideally at a location on the blade directly opposite that of the first observation.

It has been found that, in certain cutting processes using double ground blades, unsatisfactory cuts can result from blades that may exhibit a high degree of conventional "sharpness". Even though these blades may have a well-defined, finely honed cutting edge, they may not yield consistently satisfactory cuts. It has been determined that the unsatisfactory blade performance in these processes frequently can be traced to significant differences in the bevel width observed on each side of the blade, which cause the length-wise axis of the cutting edge to be displaced from the longitudinal centerline of the blade.

The invention disclosed herein provides a system whereby bevel widths on both sides of a blade may be observed, and the differences in width can be readily noted, while the blade is in operation. In another embodiment, the invention provides a system whereby the blade bevel can be automatically ground to correct any detected differences in bevel width. Advantages of this invention not discussed herein will be apparent to those skilled in the art from the detailed description of the invention, including the exemplary embodiments and exemplary drawings, that follows.

BRIEF DESCRIPTION OF THE DRAWINGS

FIG. 1A schematically depicts, in cross-section, a double ground knife blade in which the two bevels are of equal width W, thereby forming a cutting edge that is both sharp and symmetric. The cutting edge is aligned with longitudinal plane P that passes through the center of the blade, parallel to the top and bottom surfaces of the blade.

FIG. 1B shows, in cross-section, a double ground knife blade in which one of the bevels has been oversharpened, resulting in a sharp but asymmetric cutting edge that, unlike the blade of FIG. 1A, is not aligned with plane P. This blade may exhibit a high degree of "sharpness" but may nevertheless produce unsatisfactory cuts.

FIG. 1C shows, in cross-section, a double ground knife blade that is "dull," as that term is commonly understood, i.e., the cutting edge exhibits a bluntness or a relatively large radius of curvature when compared with the "sharp" blades of FIGS. 1A and 1B.

FIG. 2 schematically depicts one embodiment of the inventive knife edge inspection system described herein;

FIG. 3A schematically depicts the "side-by-side" image generated by the system of FIG. 2;

FIG. 3B schematically depicts the image generated by the system of FIG. 4, in which the image has been electronically stored and manipulated to yield an "end-to-end" comparison image of the upper and lower bevels and the blade edge;

FIG. 4 schematically depicts another embodiment of the inventive knife edge inspection system described herein, similar to that shown in FIG. 2, but modified for use with a digital image processing system;

FIG. 5 is a top-level process flow diagram of exemplary digital signal processing steps that could be used as part of the system of FIG. 4.

FIG. 6 schematically depicts a system in which control signals are generated by a digital processor, and a conventional control loop connects the processor with a controllable sharpening means to provide the selective grinding of a blade in response to signals generated by a blade inspection system such as that depicted in FIG. 4, thereby maintaining optimum blade sharpness.

DESCRIPTION OF PREFERRED EMBODIMENTS

For discussion purposes, bevels 6 and 8, as shown in FIGS. 2 and 4, will be referred to as the upper and lower bevels, respectively, and will be shown on a linear blade 10 such as are found in reciprocating cutters and band knives. It should be understood that this invention is applicable to double ground blades that are circular, elliptical, or that have other shapes, and to any such double ground blade, regardless of shape or relative orientation, so long as the blade, when optimally sharp, has equal bevel widths as generally depicted in FIG. 1A.

FIG. 2 depicts an embodiment of the invention suitable for manual inspection of a moving, double ground blade and manual adjustment of any sharpening means. Blade 10 is shown directly facing illuminating fiber optic lens 20, which in turn is connected to light source 22. For proposes of this description, it is assumed that, in operation, blade 10 moves perpendicular to the plane of the page. The purpose of lens 20 and light source 22 is to provide a source of relatively high intensity light that illuminates the cuting edge 4 of blade 10 in a"head on" direction, i.e., the light should illuminate both of the bevels 6, 8 comprising the cutting edge 4. In the embodiment shown, both bevels are illuminated equally; this may be preferred under most conditions, but is not necessary for the practice of this invention. It is foreseen that illumination of different intensities, or illumination from multiple sources of illumination, or from different directions, could be used if circumstances warrant.

Also shown in FIG. 2 are remote video camera head 30 and mirror 40, to allow for viewing the direct image of bevel 6, facing camera head 30, and the reflected image of bevel 8 (hereinafter and in the Figures, reflected images shall be designated with a prime following the feature represented), facing away from camera head 30, as explained below. Camera head 30 is positioned in close proximity to the blade 10 to be inspected, and approximately perpendicular to the cutting edge 4. Camera head 30 preferably should be positioned to place the direct image of blade bevel 6 near, but not beyond, the mid-point of the field of view 31 of the camera head 30, as depicted in FIG. 3A. Actual camera-to-blade distances can be adjusted to accommodate space within the machine, the focal length of available camera lenses, etc.

Directly opposite camera head 30, on the other side of blade 10, is mounted mirror 40. In one preferred embodiment, mirror 40 is a "corner cube" mirror, comprised internally of three mirrored cubes, each joined at a lower, inner corner. Such mirrors have the property that the angle of incidence and the angle of reflection are not only equal (as they are for a conventional mirror), but the direction of incident light and of reflected light are identical - the mirror reflects as if it is perpendicular to the incident light, regardless of the actual angle of incidence. Mirrors of this kind are readily available from scientific or optical supply sources, such as Edmond Scientific, and offer the advantage of facilitating the necessary alignment of camera head 30, blade 10, and mirror 40 to achieve the desired image. In another embodiment of this invention, a simple"V" mirror comprised of a reflective, flat-sided notch, such as depicted in cross-section at 40, may be used.

In operation, camera head 30 and mirror 40 are positioned so that camera head 30 directly observes upper bevel 6, and also observes the reflected image 8' of lower bevel 8, as, for example, reflected off mirrored surfaces 42, 44. As depicted in FIG. 2, light from illuminating lens 20 striking the upper bevel 6 is reflected directly into the left-hand portion of the lens of camera head 30. Light from lens 20 striking the lower bevel 8 is reflected downward, striking the left side of mirror 40. Due to its construction, the image of the lower bevel 8 is reflected from mirrored surface 42 onto the right side of mirror 40, as indicated, and then via mirrored surface 44, upwards, where it strikes the right-hand portion of the lens of camera head 30. Although the actual light path is more complicated if a corner cube mirror is used, the overall result is similar. The image generated on electronic display device such as television monitor 33 by the system of FIG. 2 is depicted at 31 in FIG. 3A. The direct image showing upper bevel 6 (directly facing camera head 30) is presented on the upper half of the screen, while the reflected image 8' of the lower bevel 8 (facing away from camera head 30) is presented directly below, so that the relative widths of the respective bevels can be visually compared. If the bevels do not appear to be of equal width, the blade is in a condition similar to that shown in FIG. 1B, and the operator can make an appropriate adjustment.

The spacing between the direct and reflected images may be adjusted by conventional adjustment means to allow carefully controlled adjustment of the lateral position of mirror 40 relative to the position of cutting edge 4. As may be visualized by reference to FIG. 2, it is preferred that the cutting edge 4 of blade 10 be parallel to the notch axis 46 in mirror 40 (or the equivalent axis if mirror 40 is of the corner cube type). Ideally, cutting edge 4 should approach, but should maintain some small distance from, notch axis 46 (or its corner-cube equivalent), as viewed by camera head 30 (see FIG. 2). The lateral distance separating cutting edge 4 from notch axis 46 (or its corner cube equivalent), will be half the distance separating the images of the upper and lower bevels as seen on video monitor 33 and as shown at 31 in FIG. 3A.

To avoid excessive problems relating to the need to keep both the direct and reflected image in focus and at the same apparent distance (i.e., minimize any variations in observed bevel width that are due only to the increased path length), it is preferred that the difference between the direct image path length and the reflected image path length be kept as small as possible. This can be achieved by choosing a mirror that has a suitably narrow effective"V" width, and by placing the mirror as close a possible to the lower bevel 8.

If the blade is being mechanically sharpened as part of the process, an appropriate adjustment can be made manually to the blade sharpening means. For example, if the knife blade is a linear blade installed in a band-type or reciprocating-type cutting apparatus and the apparatus has a sharpening station at which the blade is periodically or continuously sharpened as the blade moves past the station, the operator can manually adjust the pressure, frequency, or duration with which grinding or honing surfaces contact the bevelled portion of the blade as the blade moves past the sharpening station.

As described below and depicted in FIGS. 4 and 5, the bevel width comparison process may be automated, as through the use of a framegrabber and associated image processing computer 34. An advantage to the use of framegrabber and computer 34 is the ability to enhance the reflected image of the lower bevel to compensate for the additional path length and reflective losses. An additional advantage is the ability to present the comparison of the two bevels in linear fashion on an electronic display device such as computer monitor 36, i.e., display the upper and lower bevels as strips laid end-to-end, as depicted in FIG. 3B, rather than in side-by-side fashion as depicted in FIG. 3A.

Yet another advantage to the use of image processing is that, when used with additional digital processing, digital signals corresponding to the absolute upper and lower bevel widths, as well as the difference between them, can be generated by computer 34 using known processes such as those depicted in FIG. 5. These signals may be sent directly to monitor 36 in the form of a graphical display. Alternatively or additionally, these signals can be used as control signals and can be directed, via a conventional control loop 52 as shown in FIG. 6, to conventional automated grinding or honing means 50 (or other sharpening means). In response to these control signals, the sharpening means 50 automatically can be adjusted to control the pressure, frequency, or duration with which grinding or honing surfaces contact the bevelled portion of the blade as the blade moves past the sharpening station, so as to make each of the bevels substantially equal in width to the other, within some pre-defined range or tolerance specified in computer 34.

If automation of the sharpening process is not desired, automation of the bevel comparison process is still practical. Following capture of an appropriate image using the system of FIG. 4, this process may be carried out by several methods known to those skilled in the art. FIG. 5 depicts one such process.

Although the inspection system described herein can be used regardless of whether the blade is moving or not moving past the camera head, it has been discovered that if the knife blade is moving in a direction parallel to the cutting edge, the illuminated image on an electronic display device such as a television or computer monitor 33, 36 is usually enhanced, due to the blurring of surface defects on the bevel that would otherwise detract from the image of the bevel, and the inherent "averaging" effects that result from looking at an image of a moving blade. If it is desired to inspect the blade bevels and cutting edge of the knife while the cutter is in operation, conventional digital techniques may be used to generate a freeze frame or "snap shot" image of the moving blade for display on computer monitor 36, thereby stopping blade motion and providing for "on the fly" assessments of blade and edge condition. Alternatively, in the system of FIG. 2 where digital image processing equipment is not employed, the blade could be illuminated with a stroboscopic light source, or the video camera can be equipped with a high speed shutter, to achieve a similar result.

Having described the principles of my invention in the form of the foregoing exemplary embodiments, it should be understood to those skilled in the are that the invention can be modified in arrangement and detail without departing from such principles, and that all such modifications falling within the spirit and scope of the following claims are intended to be protected hereunder.

What is claimed:

1. A method for inspecting a double ground knife blade having a cutting edge comprised of two adjoining and converging bevels, each bevel located on a respective side of said blade, by comparing the width of one of said adjoining bevels on one side of said blade with the other of said adjoining bevels on the other side of said blade, said method comprising the steps of:

a. providing illumination means for said knife blade with said cutting edge, said edge being formed by the convergence of a first bevel on a first side of said blade and a second bevel on a second side of said blade, said first and said second sides being on adjoining sides of said cutting edge, said illumination means serving to illuminate both said first and said second bevels;

b. positioning a reflecting means on said first side of said knife blade, said reflecting means being configured to direct an image of said first bevel into a camera means positioned on said second side of said knife blade, opposite said reflecting means; and c. positioning said camera means on said second side of said knife blade to allow direct observation of said second bevel and to allow, within the same field of view, the separate, simultaneous observation of the image of said first bevel as reflected by said reflecting means.

2. The method of claim 1 wherein said reflecting means is a corner cube mirror.

3. The method of claim 2 wherein said viewing means is a television camera, and wherein said reflected image of said first bevel and said direct image of said second bevel image are electronically processed and presented on an electronic display means.

4. The method of claim 3 wherein said reflected and direct images are presented in an end-to-end arrangement on said imaging means.

5. The method of claim 3 wherein said reflected and direct images are electronically processed to provide a freeze frame image of said first and second bevels.

6. A method for automatically maintaining a double ground knife blade having a cutting edge comprised of two adjoining bevels in a state of optimum sharpness by conducting assessments to compare the width of one of said two adjoining bevels with the other of said two adjoining bevels, and engaging a sharpening means in response to the results of such assessments to maintain a desired bevel width and bevel width uniformity, said method comprising the steps of:

a. providing illumination means for a knife blade with a cutting edge, said edge being formed by the convergence of a first bevel on a first side of said blade and a second, adjoining bevel on a second side of said blade, said illumination means serving to illuminate both said first and said second bevels;

b. positioning a reflecting means on said first side of said knife blade, said reflecting means being configured to direct an image of said first bevel into an electronic camera means positioned on said second side of said knife blade, opposite said reflecting means, said camera means serving to transform the image it observes into an electronic signal corresponding to said image;

c. positioning said electronic camera means on said second side of said knife blade to allow said camera means to directly observe said second bevel and to allow said camera to observe, within the same field of view, the separate, simultaneous image of said first bevel as reflected by said reflecting means and to generate an electronic signal corresponding to said signal;

d. electronically processing said signal from said camera means to generate control signals that correspond to the width of said first bevel and the width of said second bevel, and the difference between said widths, as observed by said camera; and e. directing said control signals to said sharpening means, whereby said sharpening means, in response to said control signals, adjusts said first bevel width and said second bevel width, as required, to maintain optimum bevel width and optimum bevel width differential, as observed by said camera means.

7. The method of claim 6 wherein said electronic signal from said camera means is digitally processed prior to being directed to an electronic display means and transformed into an observable image.

8. An apparatus for inspecting a double ground knife blade having a cutting edge comprised of two adjoining and converging bevels, each bevel located on a respective side of said blade, by comparing the width of one of said adjoining bevels on one side of said blade with the other of said adjoining bevels on the other side of said blade, said apparatus comprising:

a. illumination means for said knife blade with said cutting edge, said edge being formed by the convergence of a first bevel on a first side of said blade and a second bevel on a second side of said blade, said first and said second sides being on adjoining sides of said cutting edge, said illumination means being adapted to illuminate both said first and said second bevels;

b. reflecting means on said first side of said knife blade, said reflecting means being configured to direct an image of said first bevel into a camera means positioned on said second side of said knife blade, opposite said reflecting means; and c. camera means for generating a video signal, positioned on said second side of said knife blade and adapted to provide, when said signal is sent to a suitable display means, the direct observation of said second bevel and to allow the separate, simultaneous observation of the image of said first bevel as reflected by said reflecting means.

9. The apparatus of claim 8 which further comprises digital image processing means, associated with said camera means, for electronically enhancing said video signal from said camera means prior to said signal arriving at said display means.

10. The apparatus of claim 8 which further comprises a. electronic control signal generating means for electronically processing said signal from said camera means to generate control signals that correspond to the width of said first bevel and the width of said second bevel, and the difference between said widths, as observed by said camera;

b. automatic sharpening means which, in response to said control signals, adjusts said first bevel width and said second bevel width, as required, to maintain optimum bevel width and optimum bevel width differential, as observed by said camera means.

\* \* \* \* \*